United States Patent
Shin

[11] 3,892,467
[45] July 1, 1975

[54] INERTIAL STABILIZATION SYSTEM
[75] Inventor: Ihsuk Shin, Berwyn, Pa.
[73] Assignee: Dynasciences Corporation, Blue Bell, Pa.
[22] Filed: May 15, 1973
[21] Appl. No.: 360,614

[52] U.S. Cl. .............................. 350/16; 356/149
[51] Int. Cl. .............................. G02b 23/00
[58] Field of Search ..................... 350/16; 356/149

[56] References Cited
UNITED STATES PATENTS

| | | | |
|---|---|---|---|
| 3,434,771 | 3/1969 | Alvarez | 350/16 |
| 3,446,980 | 5/1969 | Meier | 350/16 X |
| 3,504,957 | 4/1970 | Heflinger et al. | 350/16 |
| 3,728,948 | 4/1973 | Fraser | 350/16 X |

*Primary Examiner*—David H. Rubin
*Attorney, Agent, or Firm*—Stanley Bilker

[57] ABSTRACT

An inertial stabilization system for maintaining the optical axis of an optical device substantially stabilized with respect to inertial space when a housing containing the optical device is subjected to displacements. The optical device is decoupled from the housing about mutually perpendicular axes. A gyroscopic compensation mechanism connected to the optical device provides for optical axis stabilization even when the housing is subjected to displacements having low frequency characteristics. The gyro compensation mechanism includes a gyroscope rotor device which is rotatively driven through magnetic coupling to a gyroscope rotor drive mechanism mounted to the housing.

9 Claims, 7 Drawing Figures 3,892,467
SHEET 1
FIG. 1
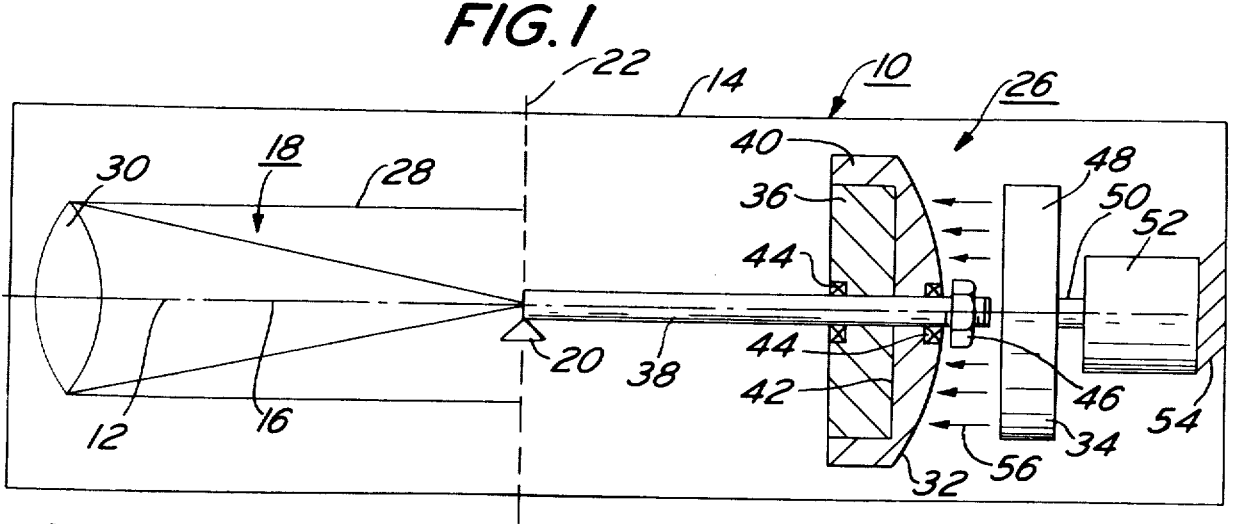
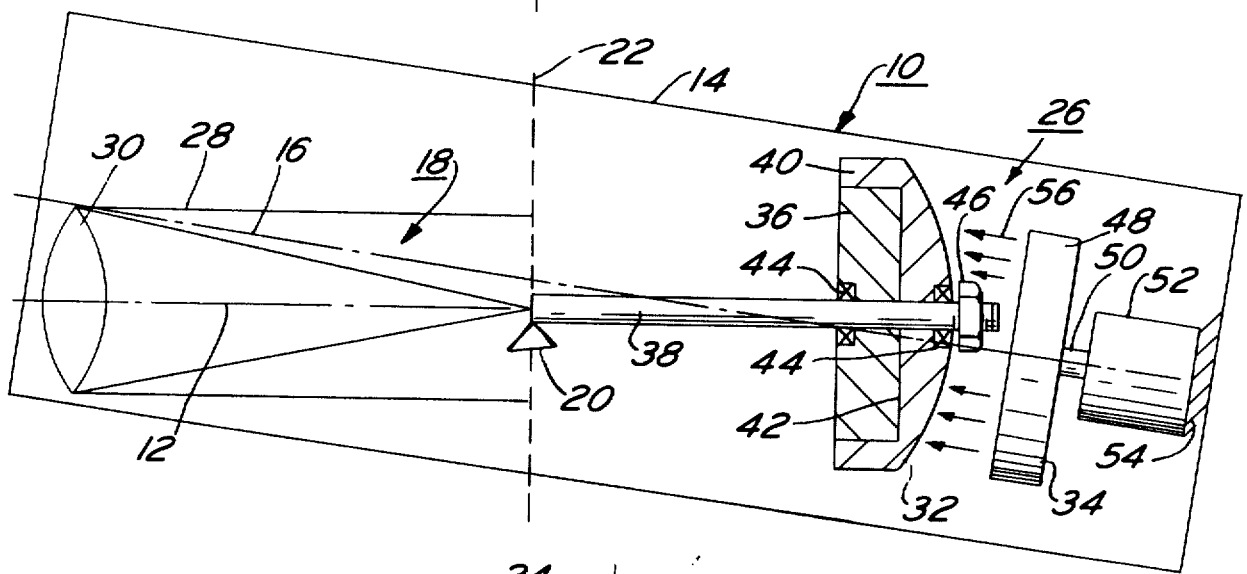
FIG. 2
FIG. 7
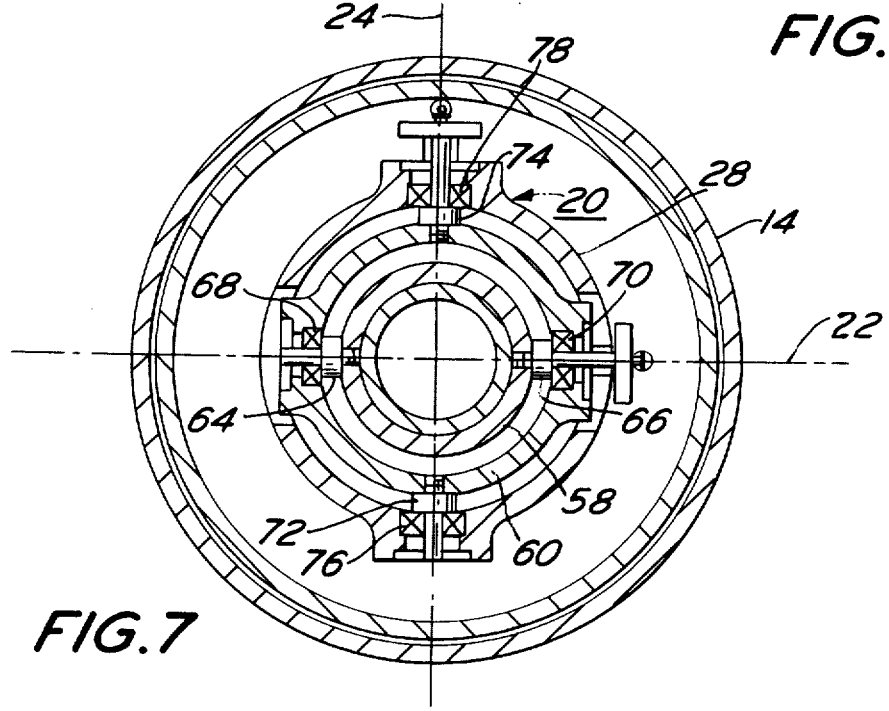

3,892,467

INERTIAL STABILIZATION SYSTEM

BACKGROUND OF THE INVENTION

1. Field of the Invention

This invention pertains to image motion compensation systems. In particular, this invention relates the improved stabilization of an optical axis of a device when low frequency displacement characteristics are being applied to an environment surrounding the device.

2. Prior Art

Inertial stabilization systems applied to optical mechanisms for maintaining the optical path of the mechanism coincident with a desired line of sight are known in the art. In some prior systems, stabilizing supports are connected to the optical mechanism and opposingly interface with the ground or other inertially stabilized surface. However, such stabilizing supports are restricted in their use and are not applicable to optical mechanisms which must be hand held or operated in a vibrating environment.

Other prior devices and methods have been used for compensating for random image motion. Such prior devices include various complex refractive systems, electronic systems, and inertially-stabilized mirror systems that employ complicated instrumentation and delicately aligned optical components. Such devices are costly to construct and operate and inherently include a decrease in the quality of an observable image due to additional optical elements required in the light path.

In other prior stabilization devices, random angular motion of the viewing device is compensated for by a pivotal system in which an objective lens is mounted on an inertial balance member. This permits the objective lens to be pivoted in order to maintain the optical axis of the objective parallel to the desired line of sight. This prior apparatus provides good stabilization characteristics when moderate or high frequency displacements are concerned. However, such prior devices utilizing inertial torque of pivoted members for stabilization have generally poor response characteristics at lower frequency since torque is a product of the moment of inertia of the pivoted member and the angular acceleration which in turn is proportional to the square of input vibration frequency. Thus, the lower the frequency, the smaller the torque with a resulting loss in stabilization. The present invention is an improvement on the inertial stabilization image motion compensator shown and described in prior U.S. Pat. No. 3,728,948.

SUMMARY OF THE INVENTION

An inertial stabilization system for compensation of low frequency displacement characterisstics includes a housing containing an optical mechanism with the housing being displaceable with respect to inertial space. An angular decoupling mechanism decouples the optical mechanism from the displacement of the housing about mutually perpendicular axes defining a pivot plane. A gyroscopic compensation mechanism mounted to the optical mechanism within the housing inertially stabilizes the optical mechanism with respect to inertial space when the housing is subjected to low frequency displacements.

BRIEF DESCRIPTION OF THE DRAWINGS

FIG. 1 is a schematic view of the inertial stabilization system where the housing is not subjected to displacement and the optical axis is coincident with the housing axis;

FIG. 2 is a schematic view of the inertial stabilization system where the housing is subjected to an angular displacement;

FIG. 7 is sectional view of the angular decoupling mechanism, shown schematically as a pivot member in FIGS. 1 and 2.

DESCRIPTION OF THE PREFERRED EMBODIMENTS

Figure 3:
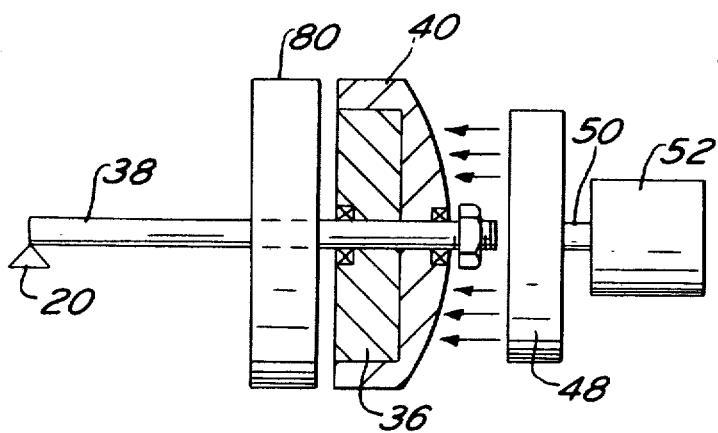
FIG. 3 is a schematic view of an embodiment of the invention showing a non-rotating counterbalance weight added to the gyroscope rotor mechanism.

Referring now to FIGS. 1 and 2, there is shown a schematic representation of inertial stabilization system 10 applied to an optical system. The object of system 10 is to maintain optical axis 12 substantially stabilized with respect to inertial space when housing 14 having housing axis 16 is subjected to a displacement. In particular, stabilization system 10 compensates for low frequency displacement characteristics which may be exhibited in one form through the involuntary movement of an operator's hands when holding housing 14 and sighting a target along optical axis 12.

In general, stabilization system 10 includes housing or outer frame 10 which is freely moveable with respect to inertial space. Optical mechanism 18 is contained within housing 14 and is decoupled therefrom, as is shown by schematic pivot member 20. Pivot member 20, shown in FIGS. 1 and 2, schematically represents the mechanism for decoupling optical mechanism 18 from any displacement of housing 14. The decoupling of optical mechanism 18 is about a pivot plane which is defined by mutually perpendicular axes 22, 24, shown in FIGS. 1, 2 and 7. One form of decoupling mechanism is shown in FIG. 7 and will be detailed in following paragraphs. In overall concept, stabilization system 10 further includes gyroscopic compensation mechanism 26 which is mounted to decoupling or pivot mechanism 20 within housing 14 for inertially stabilizing optical mechanism 18 with respect to inertial space when housing 14 is subjected to low frequency displacement.

Housing or outer frame 14 may be tubular in construction or otherwise geometrically contoured. Further, housing 14 may be adapted to be hand held by an operator for sighting an object along optical axis 12. The overall contour or structure of housing 14 is not critical to the inventive concept as is herein detailed, with the exception being that housing 14 be structured to accommodate optical mechanism 18, angular decoupling mechanism 20, and gyroscopic compensation mechanism 26 as is herein described.

Optical mechanism 18, pivotally mounted within housing 14 may include optical frame 28. A lens system such as objective lens 30 is mounted to optical frame 28 on one end of optical mechanism 18. Objective lens 30 is provided to sight along optical axis 12 and produce an image at the pivot plane defined by mutually perpendicular axes 22, 24. Film or other optical systems, not important to the inventive concept, may be incorporated at the pivot plane or in other portions of housing 14 to produce the necessary optical result.

Gyroscopic compensation mechanism 26 includes gyroscope rotor mechanism 32 mounted to pivot 20, and gyroscope rotor drive mechanism 34. As is seen in schematic FIGS. 1 and 2, rotor drive mechanism 34 is rigidly secured to housing 14 and is displaceable therewith while gyroscope rotor mechanism 32 is substantially decoupled from housing or outer frame 14.

Gyroscope rotor mechanism 32 includes first permanent magnet 36 mounted on and rotatably displaceable with respect to non-rotating shaft member 38. Rotor or first permanent magnet 36 is rotatably displaceable with respect to housing 14 within a plane which is orthogonal to optical axis 12. Magnet 36, which may be disk shaped in geometrical contour is encased within electrically conductive cup 40 which as hereinafter will be detailed is utilizable as an electromagnetic precession compensation mechanism. Conductive cup 40 and first permanent magnet 36 are secured to each other along interface 42 in rigid constrainment through adhesive means, bolting or some like technique not important to the inventive concept. In this manner, rotational displacement of magnet 36 forces conductive cup 40 into an equal angular velocity rotation. Rotor mechanism 32 consisting of magnet 36 and electrically conductive cup 40, is mounted to shaft member 38 through bearings 44 which are mounted on opposing longitudinally directed surfaces of rotor mechanism 32. Bearings 44 may be roller bearings or some like bearing interface which will allow rotor mechanism 32 to spin easily about axis 12. Rotor 32 may be maintained on shaft 38 through lock nut 46 which threadedly engages shaft 38 as shown and prevents translation of rotor mechanism 32 toward rotor drive mechanism 34 beyond a predetermined point.

First permanent magnet 36 is axially magnetized (axial direction being coincident with optical axis 12) and may be of the ceramic, Alnico or other like type, well known in the art. Cup 40 is formed of an electrically conductive metal which may be brass or other high specific gravity material which will provide a high moment of inertia about the rotational axis. In operation, rotor 32 due to its bearing 44 arrangement may be rotated about shaft member 38 with low frictional restraining forces being applied thereto and may thus be used as a gyroscopic stabilizer. Thus, once rotor mechanism 32 is rotatively actuated it tends to maintain optical mechanism 18 in a relatively stabilized positional relationship with respect to inertial space independent of the movement of housing 14.

Rotation of rotor 32 is accomplished through magnetic coupling between rotor 32 and gyroscope drive mechanism 34. Magnetic coupling is utilized since a physical contact between rotor 32 and outer frame or housing 14 would possibly cause a loss in stabilization performance. Gyroscope drive mechanism 34 comprises drive or second permanent magnet 48 which is similar in construction and geometrical contour to that of magnet 36, previously described. Second permanent magnet 48 is secured to motor drive shaft 50 which is rotatively driven from motor 52 or other type of prime drive. In turn, motor drive 52 is secured to a wall member of outer frame 14 through bolts or other securing mechanisms. Mounting 54 of motor drive 52 to housing 14 is schematically shown in FIGS. 1 and 2.

Figure 6:
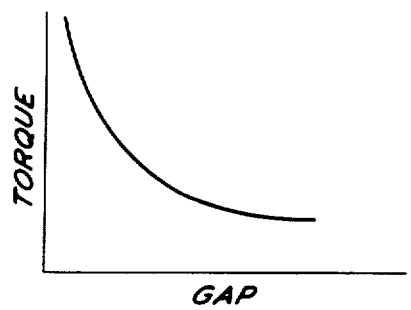
FIG. 6 is a graph showing the relation between torque and gap between opposing magnets on the gyroscopic rotor device and the gyroscope rotor drive mechanism.

As is shown in FIG. 1, second magnet 48 is positionally located in a manner such that its rotational axis is coincident with both optical axis 12 and housing axis 16 when no force displacement is applied to housing 14. Since the rotational axis of magnet 48 is aligned in fixed securement to be coincident with frame axis 16, it is seen in FIG. 2 that any angular displacement of outer frame 14 causes relative rotational displacement between rotor 32 and drive magnet 48. Referring now to FIG. 1, (when no displacement force is applied to housing 14) when magnets 36 and 48 are brought into close proximity, rotor 32 will spin synchronously with drive magnet 48. Since the members are in synchronous rotation, elemental areas facing each other on magnet 48 and conductive cup 40 have the same linear velocity. Magnetic flux density is represented by directional flux arrows 56 which produce the attractive force and magnetic coupling between rotor 32 and drive magnet 48. As is shown in FIG. 6, the resulting torque is a function of the gap between cup 40 and drive magnet 48. The larger the distance or gap, the lower the flux density with a resulting lowering of the torque drive. The gap may then be adjusted to achieve synchronous rotation of the opposing magnets 36 and 48.

Thus, when there is no input vibration to housing 14, optical axis 12 is aligned with the axis of drive magnet 48 which is always coincident with housing axis 16. However, when there is an input motion, there is an angular misalignment between magnets 36 and 48 (FIG. 2) as rotor mechanism 32 remains stabilized with respect to inertial space and magnet 48 is displaced with housing 14.

Where misalignment occurs, the attractive force between magnets 36 and 48 causes rotor mechanism 32 and optical mechanism 18 to move in a direction such that the misalignment is corrected and the axes of magnets 36, 48 are again in axial alignment. Thus the magnetic attraction between magnets 36 and 48 provides a centering or restoring torque for system 10. However, rotor mechanism 32 is a gyroscopic mass, where the precession proceeds in directions orthogonal to the directions of forces applied to it. Since rotor mechanism 32 is mounted on pivot member 20, there will be a precession motion of optical axis 12. However, due to the misalignment, the linear velocities of element areas facing each other on cup 40 and magnet 48 are not equal. Thus, the magnetic flux 56 between magnets 36 and 48 is traversed by conductive cup 40. Eddy currents are then induced in cup 40 which exerts a force normal to the axis of misalignment. This force caused by the electromagnetic reaction produces a torque about the pivot member 20 and is orthogonal to the input motion direction of magnet 48.

Figure 4:
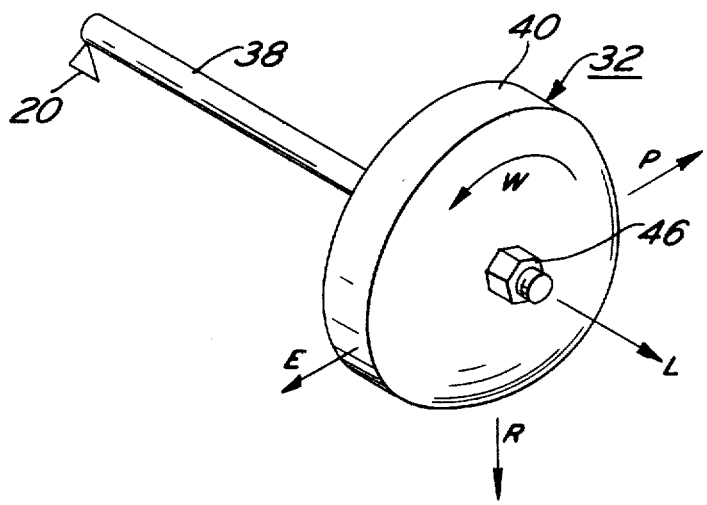
FIG. 4 is a perspective view of the gyroscope rotor mechanism showing displacement forces acting thereon.

As shown in FIG. 4, assume that the restoring force R is downwardly directed. The precession rotor 32 would then be in a direction normal to the direction of the restoring force applied thereto. The force P, acting in combination with R would cause a nutational motion. However, the downward motion caused by R, provides for electromagnetic force E to be established normal to the motion. As can be seen, the precessional torque and the electromagnetic torque about pivot 20 are in opposite directions. Thus, by arranging the physical characteristics of cup 40 and magnets 36 and 48, the precessional torque of the rotor mechanism 32 can be cancelled by the electromagnetic reaction.

The angular decoupling mechanism is shown schematically in FIGS. 1 and 2. A number of gimballed housing devices may be used to decouple optical mechanism 18 from displacement of housing 14 about a pivot plane defined by orthogonal axes 22, 24. FIG. 2 shows the gimballing mechanism used successfully in the image motion compensation device detailed in U.S. Pat. No. 3,728,948. This pivot mechanism 20 is a conventional two-axis gimbal where innermost member 58 (which may be a focusing tube or film plane) is constrained to the displacement of housing 14. The decoupled or freely moveable member of optical mechanism 18 is optical frame 28. First gimbal ring 60 is decoupled about axis 22 through gimbal rings 64 and 66. Rings 64 and 66 extend from the outer surface of innermost member 58 through gimbal bearings 68, 70. Optical frame 28 constitutes the second gimbal ring and is decoupled by gimbal pins 72, and 74 which extend from the outer surface of first gimbal ring 60 through the second set of gimbal bearings 76 and 78 which permits movement about axis 24. In this manner, optical frame 28 and corresponding lens 30 is decoupled from housing 14 and thus from input motions applied thereto in two mutually perpendicular axis, both of which are orthogonal to optical axis 12.

An embodiment of the instant invention is shown in FIG. 3 where counter-balance weight member 80 is fixedly secured to shaft 38. Balance weight 80 is non-rotating and when used in combination with rotor mechanism 32 may statically balance optical mechanism 18 about pivot member 20. In the case of motor drive 52 failure, optical mechanism 18 will still be statically balanced and system 10 may still be used as an image motion compensation device.

Figure 5:
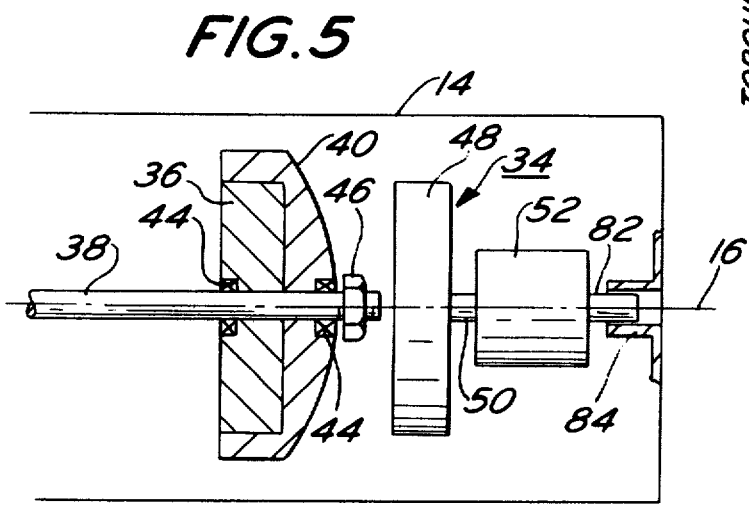
FIG. 5 is a schematic view of an embodiment of the invention showing the gyroscope drive mechanism to be translatable in order to act as a caging device.

A further embodiment of the instant invention is shown schematically in FIG. 5. In this form of the invention, gyroscope drive mechanism 34 is displaceable with respect to housing 14 in a direction coincident with frame axis 16. Motor shaft 82 is slideably mated to sleeve member 84 which is secured to a wall of housing 14. Controlled displacement of magnet 48 along axis 16 provides for control of the gap between magnets 48 and 36. As can be seen from FIG. 6, as the gap is diminished, the torque between the elements goes up in an exponential manner. Thus, in this form of the invention, drive mechanism 34 may be used as a caging mechanism and may substantially lock rotor mechanism 32 to drive mechanism 34 when the gap is sufficiently reduced.

What is claimed is:

1. In an image motion compensator for an optical system having an objective supported within a housing subject to random angular motion with respect to the optical axis, a high and low frequency inertial stabilizer comprising:
  a. means for angularly decoupling the objective from the housing about mutually perpendicular axes transverse to the optical axis and defining a pivot longitudinally spaced from the objective,
  b. a first magnetic member rotatably supported coaxially with respect to the optical axis and arranged on the opposite side of the pivot from the objective in counterbalancing disposition therewith,
  c. a second magnetic member rotatably supported on an axis fixed with respect to the housing and in spaced-apart, magnetically-coupled disposition with respect to said first magnetic member such that rotation of said second magnetic member produces corresponding rotation of said first magnetic member,
  d. drive means for rotating said second magnetic member so that the axis of rotation thereof is coextensive with the optical axis in the absence of angular displacement of the housing relative to the optical axis, and
  e. an electrically conductive member rotatable with said first magnetic member in detached disposition with respect to said second magnetic member and including a surface traversed by the magnetic field thereof,
  whereby gyroscopic precession forces produced by said first magnetic member as a result of angular displacement of the housing are counteracted by restorative precessional forces produced in said electrically conductive member by eddy currents generated therein when a relative difference in surface velocities exists between said electrically conductive member and said second magnetic member as a consequence of axial misalignment caused by such angular displacement.

2. The inertial stabilizer of claim 1 wherein said first and second magnetic members are of generally disk-like configuration.

3. The inertial stabilizer of claim 1 wherein said electrically conductive member is of cuplike configuration.

4. The inertial stabilizer of claim 3 wherein the surface of said electrically conductive member adjacent said second magnetic member is arcuately convex in configuration.

5. The inertial stabilizer of claim 4 wherein said first magnetic member is enclosed within said cup-like electrically conductive member in abutting engagement therewith.

6. The inertial stabilizer of claim 1 including a mass element coaxially affixed with respect to the objective and disposed on the opposite side of the pivot in relation thereto, said mass element statically balancing the optical system with respect to the housing.

7. The inertial stabilizer of claim 1 wherein said second magnetic member is longitudinally displaceable on the axis thereof for varying the torque between said first and second magnetic members in relation to the gap therebetween.

8. The inertial stabilizer of claim 7 wherein axial displacement of said second magnetic member into abutting disposition with said first magnetic member defines a caging restraint therefor.

9. The inertial stabilizer of claim 1 wherein said means for angularly decoupling constitutes gimbals.

* * * * *